United States Patent
Lim et al.

(10) Patent No.: US 10,363,794 B2
(45) Date of Patent: Jul. 30, 2019

(54) AIR CONDITIONING CONTROL METHOD FOR VEHICLE

(71) Applicant: Hyundai Motor Company, Seoul (KR)

(72) Inventors: Tae Woong Lim, Gyeonggi-do (KR); Jae Hyun Park, Gyeonggi-do (KR); Chun Kyu Kwon, Gyeonggi-do (KR); Jung Ho Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 234 days.

(21) Appl. No.: 15/224,852

(22) Filed: Aug. 1, 2016

(65) Prior Publication Data

US 2017/0136847 A1    May 18, 2017

(30) Foreign Application Priority Data

Nov. 18, 2015   (KR) .................. 10-2015-0161468

(51) Int. Cl.
*B60H 1/00* (2006.01)
*B60H 1/12* (2006.01)

(52) U.S. Cl.
CPC ..... *B60H 1/00735* (2013.01); *B60H 1/00764* (2013.01); *B60H 1/00807* (2013.01);
(Continued)

(58) Field of Classification Search
CPC ............ B60H 1/00735; B60H 1/00764; B60H 1/00807; B60H 1/00828; B60H 1/00885; B60H 1/12
(Continued)

(56) References Cited

U.S. PATENT DOCUMENTS 4,919,195 A * 4/1990 Tanino ............... B60H 1/00864
165/201
5,102,040 A * 4/1992 Harvey ................ F24F 11/0001
165/289
(Continued)

FOREIGN PATENT DOCUMENTS

JP    93-032021 U    4/1993
JP    1995-215044 A   8/1995
(Continued)

OTHER PUBLICATIONS

Measuring Enthalpy to Calculate Efficiency, Jul. 2011, Power Knot.*

*Primary Examiner* — Henry T Crenshaw
(74) *Attorney, Agent, or Firm* — Mintz Levin Cohn Ferris Glovsky and Popeo, P.C.; Peter F. Corless

(57) ABSTRACT

An air-conditioning control method for calculating an optimum operation amount of an air-conditioning blower in an air-conditioning system of a vehicle includes: determining a heater heat quantity after an engine of the vehicle is started under a maximum heating condition of the air-conditioning system and the air-conditioning system is turned on according to current vehicle state information and air-conditioning information; determining a lost heat quantity discharged outside the vehicle during a current air-conditioning mode; determining an effective heating energy efficiency by calculating a difference between the heater heat quantity and the lost heat quantity; calculating the optimum operation amount of the air-conditioning blower where the effective heating energy is maximized; and controlling operation of the air-conditioning blower according to the determined optimum operation amount.

13 Claims, 6 Drawing Sheets

(52) U.S. Cl.
CPC ..... *B60H 1/00828* (2013.01); *B60H 1/00885* (2013.01); *B60H 1/12* (2013.01)

(58) Field of Classification Search
USPC .......................................................... 165/202
See application file for complete search history.

(56) References Cited

U.S. PATENT DOCUMENTS

| | | | | |
|---|---|---|---|---|
| 5,167,129 | A * | 12/1992 | Akasaka | B60H 1/008 165/43 |
| 5,450,894 | A * | 9/1995 | Inoue | B60H 1/00285 165/43 |
| 7,457,711 | B2 * | 11/2008 | Kanke | G01F 1/6845 702/100 |
| 2002/0185546 | A1 * | 12/2002 | Homan | B60H 1/00735 237/2 A |
| 2006/0157576 | A1 * | 7/2006 | Eisenhour | B60H 1/00735 237/28 |
| 2010/0023167 | A1 * | 1/2010 | Ito | F24F 11/30 700/275 |
| 2012/0061069 | A1 * | 3/2012 | Schwartz | F01P 7/042 165/271 |
| 2013/0325259 | A1 * | 12/2013 | Kwon | B60H 1/00642 701/36 |
| 2016/0178253 | A1 * | 6/2016 | Katoh | F25B 41/00 62/185 |

FOREIGN PATENT DOCUMENTS

| | | |
|---|---|---|
| JP | 2011-046214 A | 3/2011 |
| JP | 2011-063247 A | 3/2011 |
| JP | 2011-105151 A | 6/2011 |
| JP | 2013-023060 A | 2/2013 |
| KR | 1019990016821 A | 3/1999 |

* cited by examiner

AIR CONDITIONING CONTROL METHOD FOR VEHICLE

CROSS-REFERENCE TO RELATED APPLICATION

This application claims under 35 U.S.C. § 119(a) the benefit of and priority to Korean Patent Application No. 10-2015-0161468 filed on Nov. 18, 2015, wherein the entire contents of which are incorporated herein by reference.

BACKGROUND (a) Technical Field

The present disclosure relates generally to an air conditioning control method for a vehicle and, more particularly, to a method of controlling air-conditioning in a vehicle that can improve heating performance of a vehicle by performing optimal operation amount control.

(b) Background Art

Modern vehicles are typically equipped with a Heating, Ventilating, and Air Conditioning (HVAC) system for controlling the interior temperature and creating a pleasant cabin atmosphere. Further, many vehicles are equipped with a Full Automatic Temperature Control (FATC) system that provides a pleasant environment by automatically controlling the interior temperature on the basis of temperature set by a driver or passengers.

In the FATC system, when a user sets a temperature, in order to control the interior temperature of a vehicle, an air conditioning controller (FATC controller) receives detection signals from a variety of sensors—for instance, a solar radiation sensor for detecting solar radiation, an external temperature sensor for detecting the temperature of external air, and an interior temperature sensor for detecting the interior temperature of the vehicle—calculates an interior thermal load on the basis of detection values from the sensors, and determines settings, including a discharge mode, a discharge temperature, a discharge direction, and air flow in consideration of an air-conditioning load corresponding to the interior thermal load. The air-conditioning controller, in order to control the interior temperature and the operation of the system, can receive detection values from sensors—for instance, a discharge temperature sensor for detecting discharge temperature, a heater temperature sensor for detecting the temperature of an electric heater (for example, a PTC heater—e.g., an auxiliary heater in a vehicle with an internal combustion engine or a main heater in an electric vehicle), and an evaporator temperature sensor for detecting the temperature of an evaporator—and can control operating parts, such as a mode actuator, a temperature door (i.e., temperature control door) actuator, a wind direction control actuator, an air-conditioning blower, an air-conditioning compressor, and an electric heater, so that the supply of air for air-conditioning is controlled in accordance with the determined discharge mode, discharge temperature, discharge direction, and discharge mount.

Meanwhile, due to recent improvement in the efficiency of engines and multistage of transmissions, conventional heat sources available for heating the interior of vehicles have been insufficient, and there is a need for a technology that can improve heating performance efficiently using the insufficient heat sources. Further, there is a need for a technology that can improve heating performance by minimizing a loss of heat energy in heating and improve warming-up performance for an engine colliding with the heating performance.

Conventionally, an air-conditioning blower is operated at a particular amount where it can produce maximum wind to supply as much heat as possible from a heat source to the interior of a vehicle through air in maximum heating of a vehicle, in which the air-conditioning blower is fixedly operated with the maximum voltage applied. Further, in order to prevent frost on the inside of windows of a vehicle, an air-conditioning mode is controlled in a ventilation mode, but in this case, the interior air is discharged outside and a large amount of energy is lost.

Therefore, heating is conventionally performed without consideration of the amount of lost energy, and as a result, energy for heating is inefficiently used. Further, the heat from an engine is used for heating, so the warming-up performance of the engine is reduced due to the loss of energy.

The above information disclosed in this Background section is only for enhancement of understanding of the background of the present disclosure, and therefore, it may contain information that does not form the related art that is already known to a person of ordinary skill in the art.

SUMMARY OF THE DISCLOSURE

The present disclosure has been made in an effort to solve the above-described problems.

A object of the present disclosure is to provide a method of controlling air-conditioning in a vehicle that can improve heating performance of a vehicle by performing optimal operation amount control, which can efficiently use an insufficient heat source of the vehicle when controlling the operation amount of an air-conditioning blower in a process of heating the interior of a vehicle, and that can improve warming-up performance for an engine by minimizing a loss of heat energy in the process of heating the interior of a vehicle.

According to embodiments of the present disclosure, a method for optimally controlling an air-conditioning system of a vehicle includes: determining a heater heat quantity after an engine of the vehicle is started under a maximum heating condition of the air-conditioning system and the air-conditioning system is turned on according to current vehicle state information and air-conditioning information; determining a lost heat quantity discharged outside the vehicle during a current air-conditioning mode; determining an effective heating energy by calculating a difference between the heater heat quantity and the lost heat quantity; calculating the optimum operation amount of the air-conditioning blower where the effective heating energy is maximized; and controlling operation of the air-conditioning blower according to the determined optimum operation amount.

The determining of the heater heat quantity may include: determining a through-heater coolant flow rate that is a flow rate of a coolant passing through a heater where the coolant and air exchange heat with each other according to the current vehicle state information; determining a heater inlet air temperature according to the air-conditioning information; determining a through-heater air flow during the current air-conditioning mode; calculating an inlet temperature difference (ITD) that is a difference between an engine coolant temperature and the heater inlet air temperature; and determining the heater heat quantity based on the through-heater coolant flow rate, the through-heater air flow, and the ITD, according to a heater heat discharge performance map that maps the through-heater coolant flow rate, the through-heater air flow, and the ITD against each other.

The current vehicle state information may include an engine revolutions per minute (RPM) and a coolant temperature in a system in which a water pump is operated to pump and circulate a coolant by engine power.

The air-conditioning information may include an external air temperature, an interior temperature, an external/internal air door opening amount, and a temperature adjustment door opening amount.

The determining of the through-heater air flow may include calculating the through-heater air flow according to a current temperature adjustment door opening amount.

The determining of the lost heat quantity may include calculating the lost heat quantity by multiplying an enthalpy difference between internal air and external air of the vehicle by an amount of discharged air that is determined based on a current external/internal air door opening amount.

The method may further include: determining a reference temperature in accordance with an external air temperature and an amount of time after the engine is started under the maximum heating condition and the air-conditioning system is turned on; comparing an interior temperature of the vehicle to the reference temperature; and calculating the optimum operation amount of the air-conditioning blower when the interior temperature of the vehicle is lower than the reference temperature.

The method may further include: determining a reference temperature in accordance with an external air temperature and an amount of time after the engine is started under the maximum heating condition and the air-conditioning system is turned on; comparing an interior temperature of the vehicle to the reference temperature; determining whether the engine has been warmed up based on a coolant temperature when the interior temperature of the vehicle is greater than or equal to the reference temperature; and reducing a current air flow from the air-conditioning blower to warm up the engine when it is determined that the engine has not been warmed up based on the coolant temperature.

The method may further include calculating the optimum operation amount of the air-conditioning blower when it is determined that the engine has been warmed up.

Furthermore, according to embodiments of the present disclosure, a system for optimally controlling an air-conditioning system includes: a vehicle having an engine and the air-conditioning system equipped therein; an air-conditioning blower disposed in the air-conditioning system; and a controller to control operation of the air-conditioning blower, the controller configured to: determine a heater heat quantity after the engine of the vehicle is started under a maximum heating condition of the air-conditioning system and the air-conditioning system is turned on according to current vehicle state information and air-conditioning information; determine a lost heat quantity discharged outside the vehicle during a current air-conditioning mode; determine an effective heating energy by calculating a difference between the heater heat quantity and the lost heat quantity; calculate the optimum operation amount of the air-conditioning blower where the effective heating energy is maximized; and control operation of the air-conditioning blower according to the determined optimum operation amount.

Furthermore, in accordance with embodiments of the present disclosure, a non-transitory computer readable medium contains program instructions for optimally controlling an air-conditioning system of a vehicle, the computer readable medium including program instructions that: determine a heater heat quantity after an engine of the vehicle is started under a maximum heating condition of the air-conditioning system and the air-conditioning system is turned on according to current vehicle state information and air-conditioning information; determine a lost heat quantity discharged outside the vehicle during a current air-conditioning mode; determine an effective heating energy by calculating a difference between the heater heat quantity and the lost heat quantity; calculate the optimum operation amount of the air-conditioning blower where the effective heating energy is maximized; and control operation of the air-conditioning blower according to the determined optimum operation amount.

Other aspects and embodiments of the present disclosure are discussed infra.

BRIEF DESCRIPTION OF THE DRAWINGS

The above and other features of the present disclosure will now be described in detail with reference to certain embodiments thereof illustrated the accompanying drawings which are given hereinbelow by way of illustration only, and thus are not limitative of the present disclosure, wherein.

Figure 1:
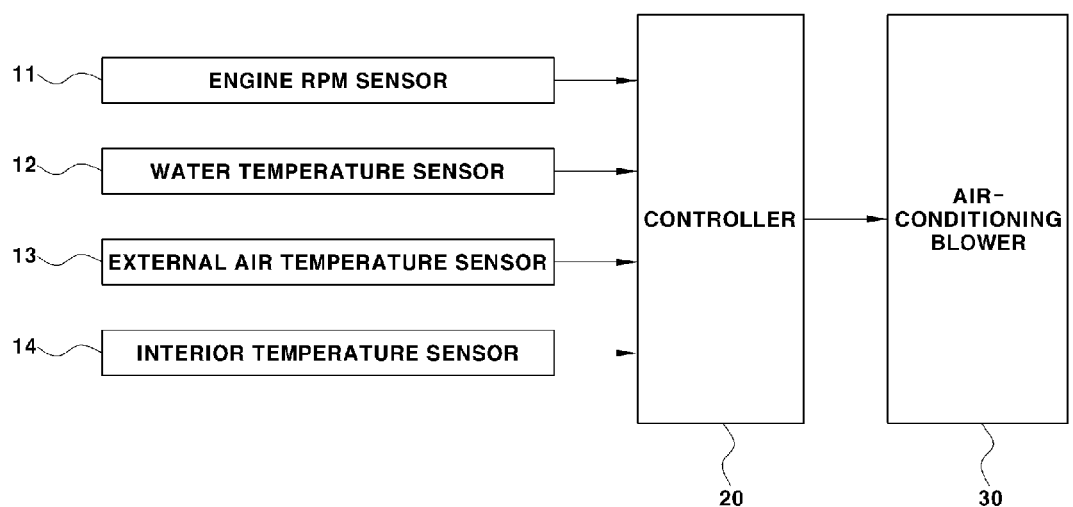
FIG. 1 is a block diagram showing the configuration of an air-conditioning system for performing an air-conditioning control method of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION OF THE EMBODIMENTS

Hereinafter reference will now be made in detail to various embodiments of the present disclosure, examples of which are illustrated in the accompanying drawings and described below. While the disclosure will be described in conjunction with embodiments, it will be understood that present description is not intended to limit the disclosure to those embodiments. On the contrary, the disclosure is intended to cover not only the embodiments, but also various alternatives, modifications, equivalents and other embodiments, which may be included within the spirit and scope of the disclosure as defined by the appended claims.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, the present disclosure will be described more fully with reference to the accompanying drawings for those skilled in the art to easily implement the present disclosure.

The present disclosure is characterized mainly by controlling the operation amount of an air-conditioning blower with air flow where the effective heating energy can be maximized when maximum heating (i.e., under a maximum heating condition), in which the effective heating energy $Q_{eff}$ is defined as the difference between heater heat quantity $Q_{heat}$ and lost heat quantity $Q_{out}$ of a vehicle.

Figure 4:
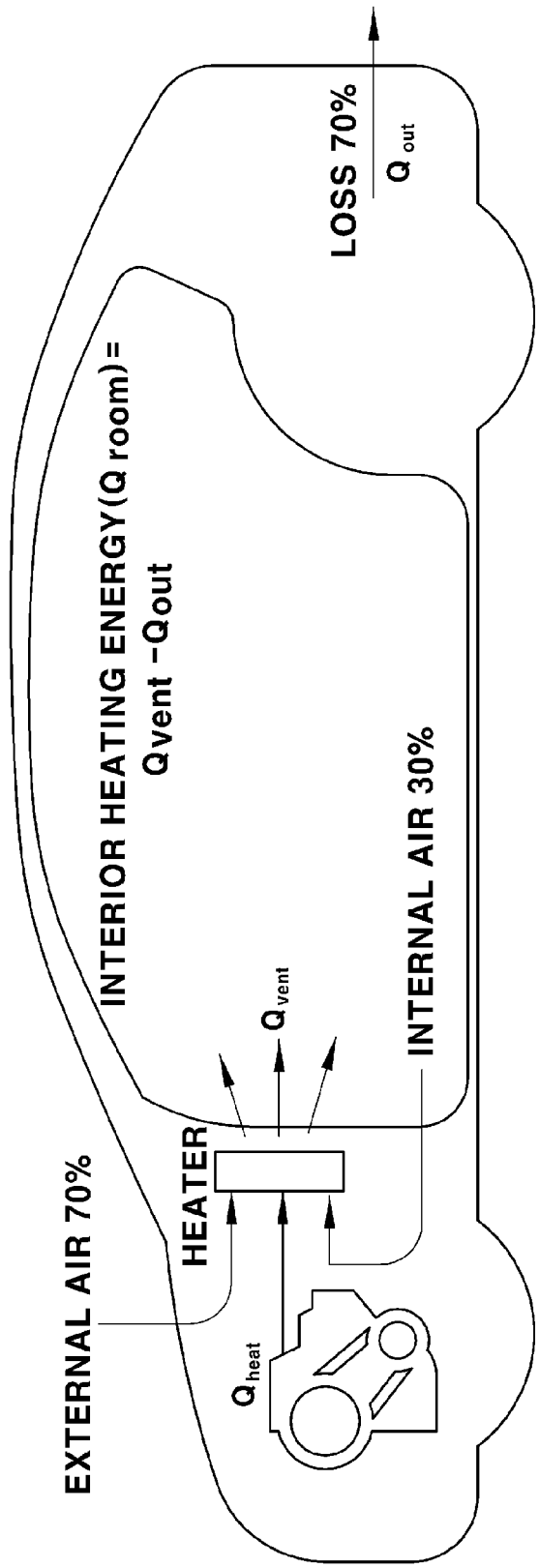
FIG. 4 is a reference diagram for illustrating the air-conditioning control method of the present disclosure.

Referring first to FIG. 4, showing a heater of an air-conditioning system using heat energy of an engine to heat the interior of a vehicle, the heater may be a heat exchanger for heating the vehicle interior, i.e., a heater core in which an engine coolant passes through the heater core and air around the heater core exchanges heat with each other. The air circulating in the vehicle in a ventilation mode of the air-conditioning system and external air from the outside of the vehicle are used for heating the interior. Further, the internal air and the external air are heated through the heater and then discharged into the interior of the vehicle. The internal air and the external air are sucked by an air-conditioning blower and then discharged into the interior of the vehicle, in which the air sent to the interior of the vehicle receives heat energy from the engine coolant while passing through the heater (i.e., heater core).

If the heat quantity supplied from the engine is $Q_{heat}$, the heat quantity $Q_{heat}$ is heat quantity discharged by the heater for air and lost heat quantity generated when the internal air is discharged outside the vehicle in the ventilation mode is $Q_{out}$. If the heat quantity supplied to the interior of the vehicle by the air, which is discharged for heating when the internal air and the external air are discharged to the interior of the vehicle after passing through the heater, is $Q_{vent}$, the interior heating energy $Q_{room}$ is '$Q_{room}=Q_{vent}-Q_{out}$'. If the heat $Q_{heat}$ is supplied by the heater and the heat $Q_{out}$ is lost to the outside of the vehicle, the effective heating energy $Q_{eff}$ is '$Q_{eff}=Q_{heat}-Q_{out}$'.

Meanwhile, in the present disclosure, the heat quantity added to air supplied to the interior through the heater, that is, the heater heat quantity $Q_{heat}$, is calculated using a heater heat discharge performance map obtained from the vehicle state information and air-conditioning information in the maximum heating; the lost heat quantity $Q_{out}$ that is the lost heat quantity discharged outside the vehicle in the current air-conditioning mode is calculated; and then the effective heating energy $Q_{eff}$ is calculated from the heater heat quantity $Q_{heat}$ and the lost heat quantity $Q_{out}$.

Further, in the present disclosure, the optimum operation point where the maximum effective heating energy is determined, and the operation amount of the air-conditioning blower is controlled at the determined optimum operation point. That is, the operation amount where a maximum amount of effective heating energy is obtained, and then, the operation of the air-conditioning blower is controlled to have the obtained (i.e., optimum) operation amount.

In general, the air flow from the air-conditioning blower in the air-conditioning system of a vehicle is related to the operation amount of the air-conditioning blower, and the air flow from the air-conditioning blower can be controlled as the operation amount of the air-conditioning blower is controlled. Further, in a general air-conditioning system of a vehicle, the voltage applied to an air-conditioning blower is controlled to control the operation amount of the air-conditioning blower, and accordingly, control of the operation amount of the air-conditioning blower may be control of the voltage applied to the air-conditioning blower.

Notably, control of the operation amount of an air-conditioning blower in the present disclosure is not limited to control of voltage applied to the air-conditioning blower, and other methods for controlling operation of the air-conditioning blower may be used. For example, in a current control type, in order to control the operation amount of an air-conditioning blower, the current supplied to the air-conditioning blower is controlled, but in a Pulse Width Modulation (PWM) control type, PWM control for an inverter for operating a blower motor of an air-conditioning blower is performed.

The configuration of the air-conditioning system for performing the air-conditioning control method of the present disclosure is described with reference to FIG. 1. As shown in the figure, an air-conditioning system includes an engine revolutions per minute (RPM) sensor 11 detecting the engine RPM, a water temperature sensor 12 detecting coolant temperature, an external air temperature sensor 13 detecting external air temperature, and an interior temperature sensor 14 detecting the internal temperature of a vehicle.

Further, a controller 20 (an air-conditioning controller, that is, an FATC controller) calculates the effective heating energy $Q_{eff}$ on the basis of signals from the sensors, calculates the optimum blower operation amount where the effective heating energy $Q_{eff}$ is maximized, and then controls the operation of the air-conditioning blower 30 to achieve the calculated optimum blower operation amount. That is, the operation amount of the air-conditioning blower 30 is controlled at the operation point where the effective heating energy $Q_{eff}$ is at a maximum to satisfy the heating performance.

Further, as described below, when the heating performance is satisfied, the operation amount of the air-conditioning blower 30 is controlled so that the heater heat quantity is reduced by the engine coolant to warm up the engine, in which the engine warming-up performance is ensured and fuel efficiency is improved by reducing the operation amount of the air-conditioning blower 30 (for example, reducing the air flow by decreasing the voltage applied to the blower).

Figure 2:
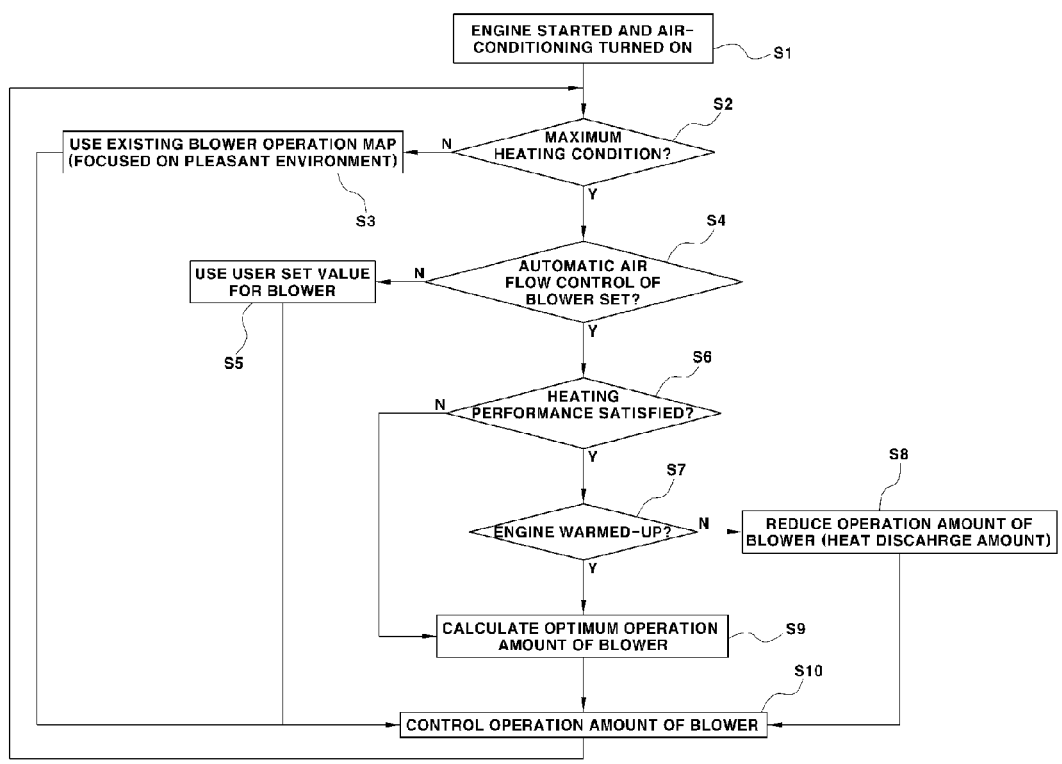
FIG. 2 is a flowchart illustrating an air-conditioning control method according to embodiments of the present disclosure.
Figure 3:
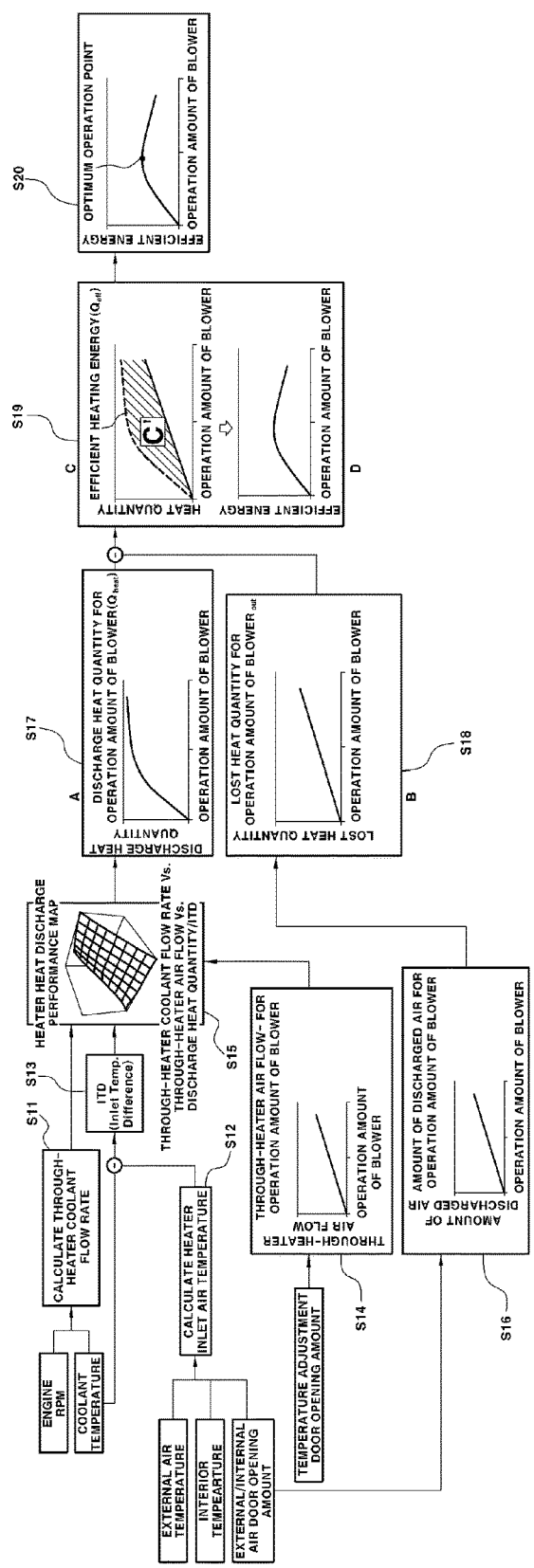
FIG. 3 is a diagram showing a process of calculating the optimum operation amount of a blower in the air-conditioning control method according to embodiments of the present disclosure.

The air-conditioning control method of the present disclosure includes a process of calculating the optimum blower operation amount, as shown in FIGS. 2 and 3, for optimum control of the air-conditioning blower. As shown in FIGS. 2 and 3, the controller 20 performs the control process described herein. That is, the controller 20 controls the operation of the air-conditioning 30 according to the optimum operation amount considering the effective heating energy through the process shown in FIGS. 2 and 3.

As shown in FIG. 2, the maximum heating condition of the air conditioning blower is determined (S2) after the engine is started and the air-conditioning system is turned on (S1), and the optimum control of the air conditioning blower is performed when the maximum heating condition of the air conditioning blower is satisfied.

If the maximum heating condition is not satisfied, the operation of the air-conditioning blower can be controlled using the existing blower operation map, as in the related art (S3 and S10).

Further, when a user sets the air flow from the air-conditioning blower to a predetermined level by operating a switch, the air flow from the blower is controlled to the level set by the user following the user's intention first (S4, S5, and S10).

On the contrary, the optimum control of the blower including the process of calculating the optimum blower operation amount is performed only when the control of air flow from the blower is set in an automatic manner, and the air-conditioning blower is controlled to have the operation amount calculated by the process of calculating the optimum blower operation amount, that is, the operation amount corresponding to the optimum air flow from the blower.

Controlling the operation amount of the air-conditioning blower may be achieved by controlling the voltage applied to the air-conditioning blower, as described above. Moreover, when the air flow from the blower is set in an automatic manner and the heating performance is not satisfied, that is, an internal temperature of the vehicle (detected by an internal temperature sensor, for example) is lower than a reference temperature determined when a predetermined amount of time passes after an engine has started, the control initiates the process of calculating the optimum operation amount of the blower (S6 and S9). Thus, the operation of the air-conditioning blower is controlled according to the calculated optimum operation amount (S9 and S10).

However, when the internal temperature of the vehicle is greater than the reference temperature and the heating performance is satisfied, whether the engine has been warmed up is based on the coolant temperature (e.g., detected by a water temperature sensor) in the vehicle (S7).

When the coolant temperature does not satisfy the engine warming-up condition (i.e., the vehicle has not warmed up), the current operation amount of the blower is reduced to a predetermined value or by a predetermined value to warm up the engine, and accordingly, the coolant heat quantity (i.e., heater heat quantity) is reduced (S8).

On the other hand, if it is determined that the engine has been warmed up in S7, the control begins the process of calculating the optimum operation amount of the blower (S9) and the operation of the air-conditioning blower is controlled at the calculated optimum operation amount (S10).

As a result, by controlling the operation of the air-conditioning blower to achieve the optimum operation amount that is calculated, the internal temperature where a pleasant environment is provided can be quickly achieved. After the temperature for the pleasant environment is achieved, the maximum heating condition is removed, as described above, and the operation of the air-conditioning blower can be controlled using the existing blower operation map (S3), as in the related art. Therefore, according to the control method of the present disclosure including the process of calculating the optimum operation amount of a blower, it is possible to improve the heating performance, for example, quickly achieving the internal temperature for the pleasant environment, and the engine warming-up performance can also be improved. Further, it is possible to reduce the heating energy and improve fuel efficiency by reducing friction resistance due to improvement of warming-up of an engine.

Figure 5A:
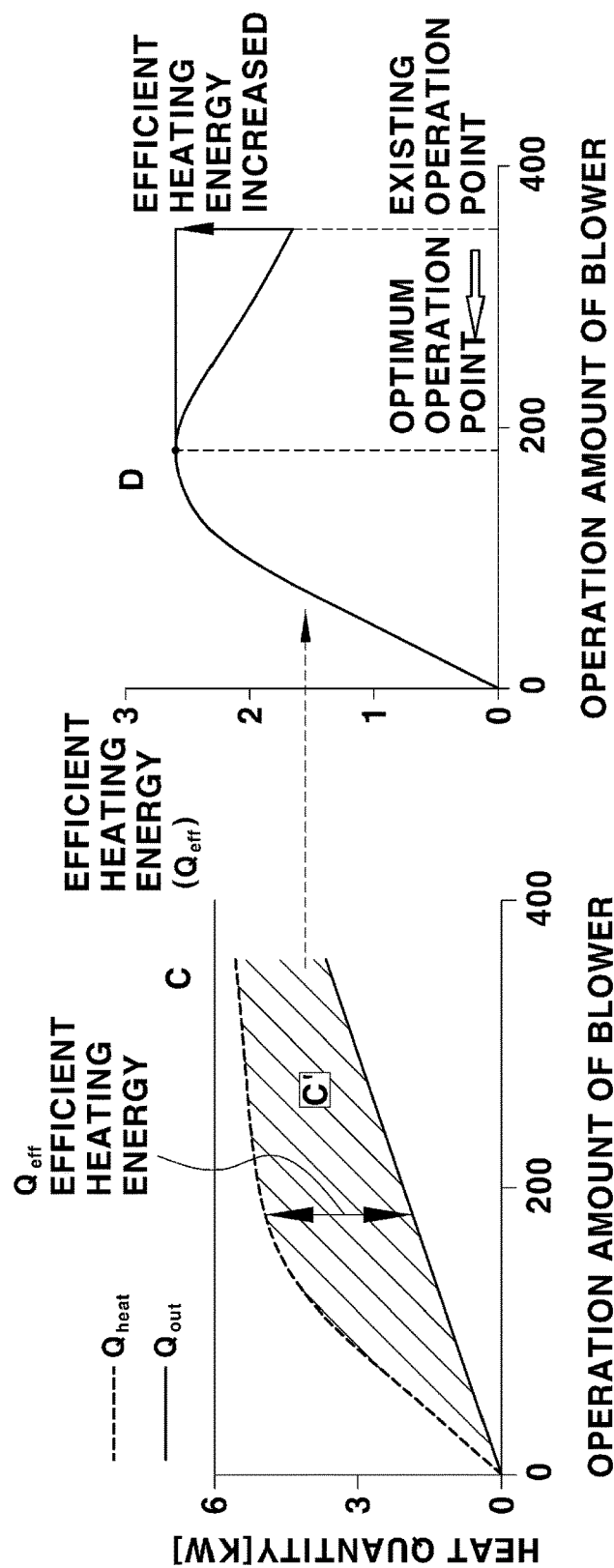
FIGS. 5A and 5B are diagrams comparing a conventional air-conditioning blower operation point and the optimum operation point according to the present disclosure.
Figure 5B:
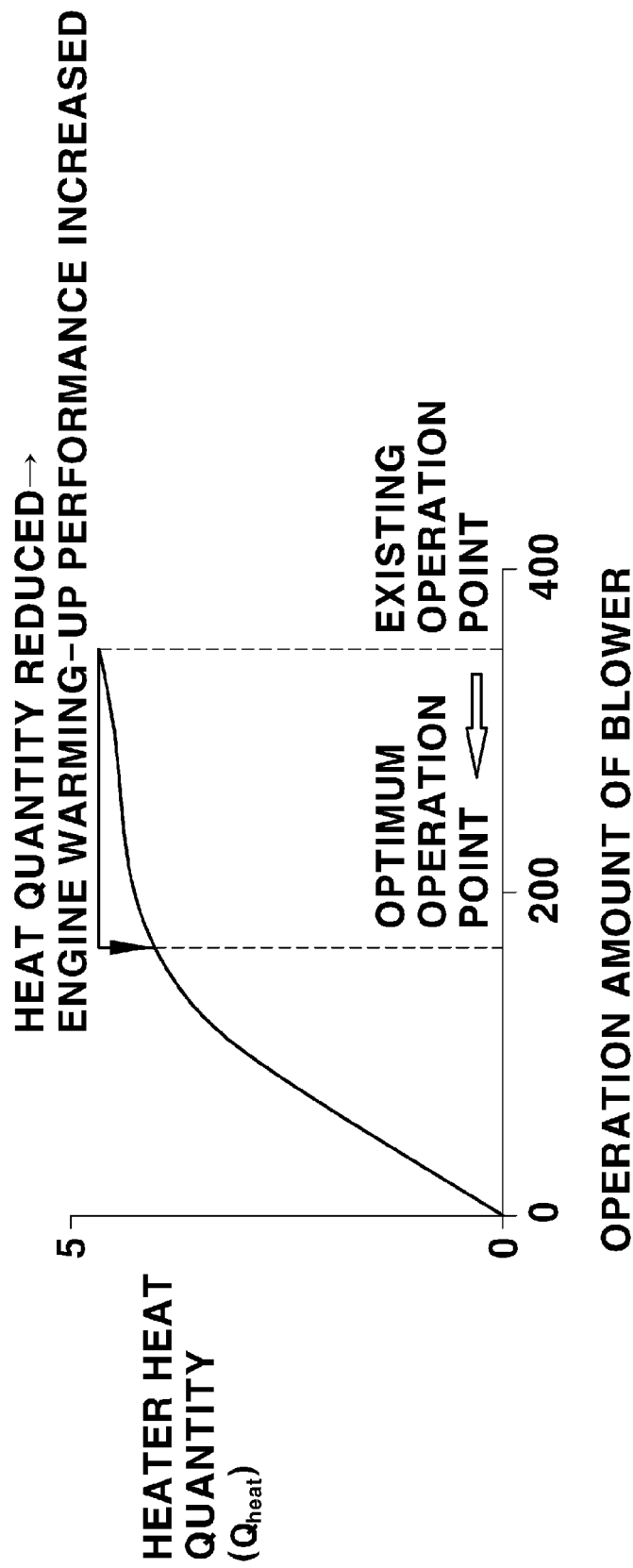

Referring now to FIGS. 5A and 5B, the graph 'C' in the left one in FIG. 5A shows a curve (dotted line) of heater heat quantity $Q_{heat}$ for the operation amount of an air-conditioning blower and a curve (solid line) of the lost heat quantity $Q_{out}$ for the operation amount of an air-conditioning blower.

As shown in FIGS. 5A and 5B, in the process of calculating the optimum operation amount of the blower, the curve of discharge heat quantity $Q_{out}$ for the operation amount of a blower showing the heater heat quantity $Q_{heat}$ according to the operation amount of the air-conditioning blower (dotted line in the left one in FIG. 5A) is obtained, and the curve of the lost heat quantity to the operation amount of a blower showing the lost heat quantity $Q_{out}$ according to the operation amount of the air-conditioning blower (solid line in the left one in FIG. 5A) is obtained.

When the two curves are obtained, as described above, the effective heating energy $Q_{eff}$ that is determined from the difference between the heater heat quantity $Q_{heat}$ and the lost heat quantity $Q_{out}$ can be obtained, in which the effective heating energy is the area C in FIG. 5A.

Further, a curve for the operation amount showing the effective heating energy $Q_{eff}$ (alternatively referred to as "efficient heating energy $Q_{eff}$" in FIG. 5A) according to the operation amount of the air-conditioning blower can be determined like the curve D in the right one in FIG. 5A, and in the curve D, the optimum operation point where the effective heating energy $Q_{eff}$ is maximized is selected and the air-conditioning blower is controlled to have the operation amount corresponding to the optimum operation point.

Referring to the curve D in FIG. 5A, it can be seen that the optimum operation point (i.e., optimum operation amount of the blower) where the effective heating energy $Q_{eff}$ can be increased as compared with the operation point of the related art is selected in the maximum heating.

FIG. 5B shows a curve showing heater heat quantity $Q_{heat}$ according to the operation amount of an air-conditioning blower through a heater, that is, a discharge heat quantity curve for the operation amount, in which the operation amount of the blower at the optimum operation point of the present disclosure is small as compared with the operation point of the related art in the maximum heating. It can thus be seen that the heater heat quantity $Q_{heat}$ can be reduced, and the warming-up performance for an engine is increased by the reduction of the heater heat quantity.

Next, the process of calculating the optimum operation amount of a blower is described with reference to FIG. 3.

First, the controller 20 receives vehicle state information and air-conditioning information. The vehicle state information may include, for example, engine RPM detected by the engine RPM sensor 11 and coolant temperature detected by the water temperature sensor 12, and the air-conditioning information may include, for example, an external air temperature detected by the external air temperature sensor 13, interior temperature detected by the interior temperature sensor 14, the external/internal air door opening amount, and the temperature adjustment door opening amount in the current air-conditioning mode.

In a system in which a water pump is operated to pump and circulate a coolant by engine power, the controller 20 calculates the flow rate of a coolant passing through the heater, that is, a through-heater coolant flow rate on the basis of the engine RPM and the coolant temperature which are the vehicle state information (S11).

Further, the controller 20 calculates the heater inlet air temperature on the basis of the external air temperature, the interior temperature and the external/internal air door opening amount which are the air-conditioning information (S12) and calculates an Inlet Temperature Difference (ITD) that is the difference between the coolant temperature and the heater inlet air temperature (S13).

In the present disclosure, the through-heater coolant flow rate and the heater inlet air temperature are variables used in the existing air-conditioning control process and the process of calculating the variables from vehicle state information or air-conditioning information, or vehicle state information and air-conditioning information is well known to those skilled in the art. As such, a detailed description thereof is not provided.

The vehicle state information and the air-conditioning information which are used to calculate the through-heater coolant flow rate and the heater inlet air temperature are not limited thereto and may be changed in various ways and various calculation processes are also well known, so it is not specified herein.

The controller 20 obtains through-heater air flow for the operation amount of an air-conditioning blower by calculating the through-heater air flow, which corresponds to the current temperature adjustment door opening amount, to the operation amount of an air-conditioning blower (S14).

Through-heater air flow data for the operation amount of an air-conditioning blower can be obtained by calculating or obtaining through-heater air flow corresponding to the current temperature adjustment door opening amount for the operation amount of the air-conditioning blower from a map or an equation set in the controller. For example, using a three-dimensional (3D) map where values of 'temperature adjustment door opening amount vs. through-heater air flow vs. operation amount of air-conditioning blower' are defined, the through-heater air flow data for the operation amount of an air-conditioning blower can be obtained, and data of 'through-heater air flow vs. operation amount of air-conditioning blower' at the temperature adjustment door opening amount determined as a specified value can be obtained from the 3D map.

Referring now to FIG. 3, a 2D curve of 'through-heater air flow Vs operation amount of air-conditioning blower' obtained from the 3D map in S14 is exemplified.

Next, the controller 20 obtains a heat discharge curve 'A' showing the operation amount of an air-conditioning blower showing the heater heat quantity $Q_{heat}$ according to the operation amount of an air-conditioning blower using a heater heat discharge performance map from the calculated values (S15 and S17).

The heater heat discharge performance map is a 3D map where values of the through-heater coolant flow rate, through-heater air flow, and the heater heat quantity $Q_{heat}$/ITD are mapped against each other (i.e., through-heater coolant flow rate vs. through-heater air flow vs. heater heat quantity $Q_{heat}$/ITD). The through-heater coolant flow rate and the ITD were specified and the through-heater air flow for the operation amount of an air-conditioning blower was obtained in the previous calculation process, so the two-dimensional (2D) curve of 'air flow of blower vs. heater heat quantity $Q_{heat}$' can be obtained from the heater heat discharge performance map.

Further, the controller 20 obtains the lost heat quantity $Q_{out}$ discharged outside a vehicle for the operation amount of an air-conditioning blower in the current air-conditioning mode (S18). The lost heat quantity $Q_{out}$ is obtained by multiplying of an enthalpy difference between internal air and external air and the amount of discharged air, in which the amount of discharged air means the amount of air discharged outside the vehicle at the current external/internal door opening amount in the maximum heating and the ventilation mode.

The amount of discharged air for the operation amount of an air-conditioning blower corresponding to the current external/internal door opening amount is obtained to obtain the lost heat quantity $Q_{out}$ for the operation amount of an air-conditioning blower (S16), and then it is possible to obtain the data of lost heat quantity for the operation amount of a blower by multiplying an enthalpy difference between internal air and external air and the amount of discharged air corresponding to the operation amount of an air-conditioning blower (S18).

Referring again to FIG. 3, a lost heat quantity curve B, which shows the lost heat quantity $Q_{out}$ obtained by multiplying the enthalpy difference between internal air and external air and the amount of discharged air for the operation amount of an air-conditioning blower as values according to the operation amount of an air-conditioning blower, is exemplified.

As a result, for the operation amount of an air-conditioning blower, when the difference between the heater heat quantity $Q_{heat}$ in the curve A and the lost heat quantity $Q_{out}$ in the curve B is obtained, the effective heating energy $Q_{eff}$ can be obtained, in which the curves showing the effective heating energy $Q_{eff}$ are the curves C and D (S19). The effective heating energy $Q_{eff}$ is the difference between the heater heat quantity $Q_{heat}$ and the lost heat quantity $Q_{out}$ and can be shown as the area C' in FIG. 3 at the operation amount of an air-conditioning blower. Further, a curve for the operation amount showing the effective heating energy $Q_{eff}$ according to the operation amount of the air-conditioning blower can be obtained like the curve D in FIG. 3, and in the curve D, the optimum operation point where the effective heating energy is the maximum is selected (S20). The operation of the air-conditioning blower is thus controlled to have the optimum operation amount corresponding to the operation point.

Although it was exemplified that curves and maps are used in the process of calculating the optimum operation amount of a blower, it is just an example and the present disclosure is not limited thereto. Further, the calculation process can be made by not curves and maps, but equations inputted in advance in the controller 20, and can be made by curves, maps, and equations.

According to the air-conditioning control method for a vehicle of the present disclosure, by performing optimal operation amount control, which can most efficiently use an insufficient heat source when controlling the operation amount of an air-conditioning blower in a process of heating the interior of a vehicle, it is possible to improve heating performance and warming-up performance of an engine, reduce heating energy (and sub-electric heater energy), reduce friction resistance with the improvement of warming-up performance for an engine, and improve fuel efficiency.

Although embodiments of the present disclosure were described in detail above, the scope of the present disclosure is not limited to the embodiments and various changes and modifications from the spirit of the present disclosure defined in the following claims by those skilled in the art are also included in the scope of the present disclosure.

What is claimed is:

1. A method for optimally controlling an air-conditioning system of a vehicle, the method comprising:
    determining a heater heat quantity for each operation amount of an air-conditioning blower after an engine of the vehicle is started under a maximum heating condition of the air-conditioning system and the air-conditioning system is turned on according to current vehicle state information and air-conditioning information;
    determining a lost heat quantity discharged outside the vehicle during a current air-conditioning mode, the lost heat quantity being determined for each operation amount of the air-conditioning blower;
    determining an effective heating energy for each operation amount of the air-conditioning blower by calculating a difference between the heater heat quantity for each operation amount of the air-conditioning blower and the lost heat quantity for each operation amount of the air-conditioning blower;
    calculating the optimum operation amount of the air-conditioning blower where a maximum amount of the effective heating energy is obtained for each operation amount of the air-conditioning blower; and
    controlling operation of the air-conditioning blower according to the determined optimum operation amount.

2. The method of claim 1, wherein the determining of the heater heat quantity comprises:
    determining a through-heater coolant flow rate that is a flow rate of a coolant passing through a heater where the coolant and air exchange heat with each other according to the current vehicle state information;
    determining a heater inlet air temperature according to the air-conditioning information;
    determining a through-heater air flow during the current air-conditioning mode;
    calculating an inlet temperature difference (ITD) that is a difference between an engine coolant temperature and the heater inlet air temperature; and
    determining the heater heat quantity based on the through-heater coolant flow rate, the through-heater air flow, and the ITD, according to a heater heat discharge performance map that maps the through-heater coolant flow rate, the through-heater air flow, and the ITD against each other.

3. The method of claim 2, wherein the current vehicle state information includes an engine revolutions per minute (RPM) and a coolant temperature in a system in which a water pump is operated to pump and circulate a coolant by engine power.

4. The method of claim 1, wherein the current vehicle state information includes an engine RPM and a coolant temperature in a system in which a water pump is operated to pump and circulate a coolant by engine power.

5. The method of claim 2, wherein the air-conditioning information includes an external air temperature, an interior temperature, and an external/internal air door opening amount.

6. The method of claim 1, wherein the air-conditioning information includes an external air temperature, an interior temperature, an external/internal air door opening amount, and a temperature adjustment door opening amount.

7. The method of claim 2, wherein the determining of the through-heater air flow comprises:
    calculating the through-heater air flow according to a current temperature adjustment door opening amount.

8. The method of claim 1, wherein the determining of the lost heat quantity comprises:
    calculating the lost heat quantity by multiplying an enthalpy difference between internal air and external air of the vehicle by an amount of discharged air that is determined based on a current external/internal air door opening amount.

9. The method of claim 1, further comprising:
    determining a reference temperature in accordance with an external air temperature and an amount of time after the engine is started under the maximum heating condition and the air-conditioning system is turned on;
    comparing an interior temperature of the vehicle to the reference temperature; and
    calculating the optimum operation amount of the air-conditioning blower when the interior temperature of the vehicle is lower than the reference temperature.

10. The method of claim 1, further comprising:
    determining a reference temperature in accordance with an external air temperature and an amount of time after the engine is started under the maximum heating condition and the air-conditioning system is turned on;
    comparing an interior temperature of the vehicle to the reference temperature;
    determining whether the engine has been warmed up based on a coolant temperature when the interior temperature of the vehicle is greater than or equal to the reference temperature; and
    reducing a current air flow from the air-conditioning blower to warm up the engine when it is determined that the engine has not been warmed up based on the coolant temperature.

11. The method of claim 10, further comprising:
    calculating the optimum operation amount of the air-conditioning blower when it is determined that the engine has been warmed up.

12. A system for optimally controlling an air-conditioning system, the system comprising:
    a vehicle having an engine and the air-conditioning system equipped therein;
    an air-conditioning blower disposed in the air-conditioning system; and a controller to control operation of the air-conditioning blower, the controller configured to:

determine a heater heat quantity for each operation amount of an air-conditioning blower after the engine of the vehicle is started under a maximum heating condition of the air-conditioning system and the air-conditioning system is turned on according to current vehicle state information and air-conditioning information;

determine a lost heat quantity discharged outside the vehicle during a current air-conditioning mode, the lost heat quantity being determined for each operation amount of the air-conditioning blower;

determine an effective heating energy for each operation amount of the air-conditioning blower by calculating a difference between the heater heat quantity for each operation amount of the air-conditioning blower and the lost heat quantity for each operation amount of the air-conditioning blower;

calculate the optimum operation amount of the air-conditioning blower where a maximum amount of the effective heating energy is obtained for each operation amount of the air-conditioning blower; and control operation of the air-conditioning blower according to the determined optimum operation amount.

13. A non-transitory computer readable medium containing program instructions for optimally controlling an air-conditioning system of a vehicle, the computer readable medium comprising program instructions that:

determine a heater heat quantity for each operation amount of an air-conditioning blower after an engine of the vehicle is started under a maximum heating condition of the air-conditioning system and the air-conditioning system is turned on according to current vehicle state information and air-conditioning information;

determine a lost heat quantity discharged outside the vehicle during a current air-conditioning mode, the lost heat quantity being determined for each operation amount of the air-conditioning blower;

determine an effective heating energy for each operation amount of the air-conditioning blower by calculating a difference between the heater heat quantity for each operation amount of the air-conditioning blower and the lost heat quantity for each operation amount of the air-conditioning blower;

calculate the optimum operation amount of the air-conditioning blower where a maximum amount of the effective heating energy is obtained for each operation amount of the air-conditioning blower; and control operation of the air-conditioning blower according to the determined optimum operation amount.

* * * * *